United States Patent
Hennings et al.

(10) Patent No.: US 11,782,008 B2
(45) Date of Patent: Oct. 10, 2023

(54) METHOD FOR CORRECTING TWO MEASURED VALUES FROM DIFFERENT ANALYTICAL MEASURING DEVICES AND MEASURING POINT FOR CARRYING OUT THE METHOD

(71) Applicant: Endress+Hauser Conducta GmbH+Co. KG, Gerlingen (DE)

(72) Inventors: Erik Hennings, Freiburg (DE); Dagmar Kaschuba, Gerlingen (DE); Marco Bezzon, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 368 days.

(21) Appl. No.: 16/942,707

(22) Filed: Jul. 29, 2020

(65) Prior Publication Data
US 2021/0033558 A1 Feb. 4, 2021

(30) Foreign Application Priority Data
Jul. 29, 2019 (DE) ...................... 10 2019 120 446.1

(51) Int. Cl.
*G01N 27/27* (2006.01)
*G01N 27/416* (2006.01)

(52) U.S. Cl.
CPC ......... *G01N 27/27* (2013.01); *G01N 27/4163* (2013.01); *G01N 27/4167* (2013.01)

(58) Field of Classification Search
CPC . G01N 27/27; G01N 27/4163; G01N 27/4167
See application file for complete search history.

(56) References Cited

U.S. PATENT DOCUMENTS

| | | | |
|---|---|---|---|
| 2011/0146382 A1 | 6/2011 | Fleischer et al. | |
| 2011/0212376 A1* | 9/2011 | Carney | G01N 27/4045 429/444 |

(Continued)

FOREIGN PATENT DOCUMENTS

| | | |
|---|---|---|
| CN | 107085117 A | 8/2017 |
| CN | 109959698 A | 7/2019 |

(Continued)

OTHER PUBLICATIONS

Krohne, Optisys CL 1100 Technical Datasheet, Mar. 2016 (Year: 2016).*

*Primary Examiner* — Caitlyn Mingyun Sun
(74) *Attorney, Agent, or Firm* — Kelly J. Smith; Endress+Hauser (USA) Holding, Inc.

(57) ABSTRACT

Disclosed is an apparatus for determining a process variable of a medium in a containment, comprising first and second oscillatory elements, first and second driving/receiving units, and electronics. The first driving/receiving unit is embodied to excite the first oscillatory element using a first electrical excitation signal to execute mechanical oscillations, and to receive the mechanical oscillations of the first oscillatory element and to convert such into a first electrical, received signal, wherein the second driving/receiving unit is embodied to excite the second oscillatory element by means of a second electrical excitation signal to execute mechanical oscillations, and to receive the mechanical oscillations of the second oscillatory element and to convert such into a second electrical, received signal, and wherein the electronics is embodied to determine the process variable from the first received signal and/or the second received signal.

2 Claims, 1 Drawing Sheet

(56) References Cited

U.S. PATENT DOCUMENTS

| | | | |
|---|---|---|---|
| 2014/0377877 A1 | 12/2014 | Bürgi et al. | |
| 2015/0136616 A1* | 5/2015 | Friedrich | G01N 27/4045 205/785.5 |
| 2015/0177182 A1 | 6/2015 | Wilke et al. | |
| 2019/0195823 A1* | 6/2019 | Chen | G01N 33/0039 |

FOREIGN PATENT DOCUMENTS

| | | |
|---|---|---|
| DE | 19628033 C1 | 11/1997 |
| DE | 10121262 A1 | 11/2002 |
| WO | 2013178714 A1 | 12/2013 |
| WO | 2014143175 A1 | 9/2014 |

\* cited by examiner

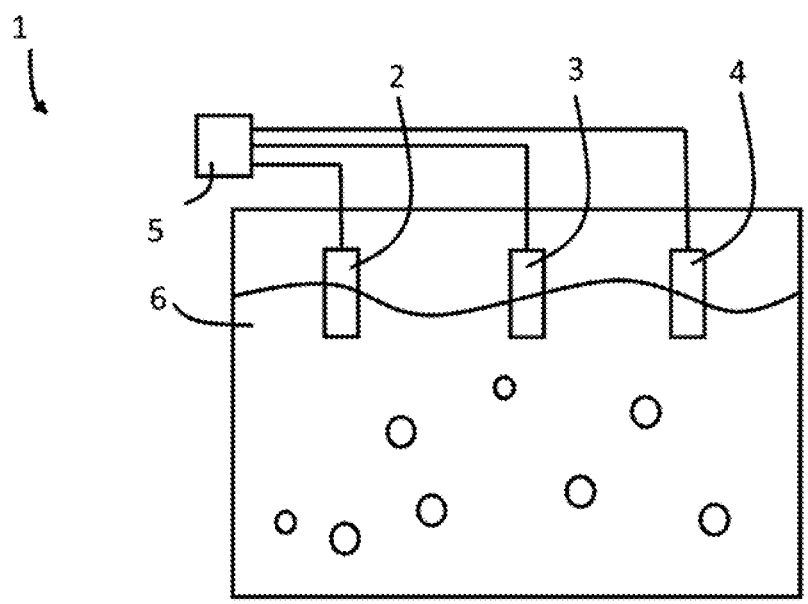

_US 11,782,008 B2_

METHOD FOR CORRECTING TWO MEASURED VALUES FROM DIFFERENT ANALYTICAL MEASURING DEVICES AND MEASURING POINT FOR CARRYING OUT THE METHOD

CROSS-REFERENCE TO RELATED APPLICATION

The present application is related to and claims the priority benefit of German Patent Application No. 10 2019 120 446.1, filed on Jul. 29, 2019, the entire contents of which are incorporated herein by reference.

TECHNICAL FIELD

The invention relates to a method for correcting a first measured value from a first analytical measuring device and a second measured value from a second analytical measuring device. The invention also relates to a measuring point for carrying out the method according to the invention.

BACKGROUND

In analytical measurement technology, especially in the fields of water management and environmental analysis and in industry, for example in food technology, biotechnology and pharmaceuticals, as well as for various laboratory applications, measurands, such as pH value, conductivity or the concentration of analytes, such as ions or dissolved gases, in a gaseous or liquid analysis medium are vitally important. These measurands can be detected and/or monitored by means of, for example, electrochemical sensors, such as potentiometric, amperometric, voltammetric, or coulometric sensors, or conductivity sensors, which are all known per se from the prior art.

Amperometric sensors comprise at least two electrodes, one of which serves as a working electrode and one as a counter electrode. The respective measurand is determined on the basis of a current flow through the working electrode. Often, the potential of the counter electrode to the working electrode or the current flow through the working electrode is regulated by means of a third reference electrode through which no current flows.

Amperometric sensors furthermore comprise a membrane through which an analyte diffuses. The analyte is electrochemically converted by the voltage applied between the two electrodes. A voltage proportional to the concentration of the analyte is produced thereby.

Amperometric disinfection sensors which are intended to measure a specific analyte, i.e., a specific disinfectant, for example chlorine, exhibit a certain cross-sensitivity to other disinfectants, for example to chlorine dioxide. This means, for example, that the amperometric disinfection sensor indicates the presence of chlorine in the presence of chlorine dioxide. This cross-sensitivity is due to the fact that the various disinfectants diffuse differently through the membrane and are converted by different electrochemical reactions.

Chlorine and chlorine dioxide, for example, are used as disinfectants in various drinking water distribution networks or disinfection plants. If analysis is carried out with an amperometric disinfection sensor, no statement can be made about the correct chlorine content or chlorine dioxide content since both substances are detected by the sensor.

The technically recognized photometric DPD test, which is listed in the DIN, cannot distinguish between different disinfectants, for example chlorine and chlorine dioxide. In this principle, only oxidation of a dye occurs, which takes place completely independently of the oxidizing agent (disinfectant).

Consequently, interference-free measurement of various parameters is not possible due to the cross-sensitivity of the various analysis methods.

In the prior art, for example in DE 196 28 033 C1, the cross-sensitivity of a first sensor to a second analyte, which originally is not to be measured by the first sensor, is calculated using a second sensor, which is sensitive only to the second analyte, in order to compensate for the cross-sensitivity of the first sensor.

However, this prior art has the disadvantage that only a cross-sensitivity of one sensor can be compensated. However, if two analytes are to be measured with two different dedicated sensors and each sensor has a cross-sensitivity to the respective other analyte, compensation of the sensors is not possible.

SUMMARY

It is therefore an object of the invention to provide a method which makes it possible to provide two measured values of two sensors with respective cross-sensitivity.

This object is achieved by a method disclosed herein. In the method according to the invention for correcting a first measured value of a first measurand of a first analytical measuring device and a second measured value of a second measurand of a second analytical measuring device, the first analytical measuring device has a cross-sensitivity to the second measurand and the second analytical measuring device has a cross-sensitivity to the first measurand.

The method according to the invention includes steps of providing a measuring point with the first analytical measuring device which is suitable for determining the first measured value of the first measurand; with the second analytical measuring device which is suitable for determining the second measured value of the second measurand that differs from the first measurand; a third analytical measuring device which is suitable for determining a third measured value of a third measurand that differs from the first and the second measurand, and a control unit which is connected to the first analytical measuring device, the second analytical measuring device and the third analytical measuring device. The first analytical measuring device has a cross-sensitivity to the second measurand, and the first measured value shows a dependence on the third measured value. The second analytical measuring device has a cross-sensitivity to the first measurand. The third analytical measuring device does not have any cross-sensitivity to the first measurand or to the second measurand. The method according to the invention furthermore comprises the following steps: determining the first measured value by means of the first analytical measuring device; determining the second measured value by means of the second analytical measuring device; and determining the third measured value by means of the third analytical measuring device. The method also includes a step of calculating a corrected first measured value by means of the control unit by taking into account the first measured value, the second measured value, the cross-sensitivity of the first analytical measuring device to the second measurand, and compensating for the dependence of the first measured value on the third measured value. The method also includes calculating a corrected second measured value by means of the control unit by taking into account the first measured value, the second measured value and the cross-sensitivity of the second analytical measuring device to the first measurand, and compensating for the dependence of the first measured value on the third measured value.

The method according to the invention makes it possible to correct the measured values of two analytical sensors responding to different analytes, both of which have a cross-sensitivity to the measurand of the respective other analytical sensor. Cross-cross-sensitivity can thus be corrected.

In one embodiment of the invention, the corrected first measured value is calculated using the following formula:

$$KM1 = \frac{M1 - \frac{M2}{Q1}}{\left(1 - \frac{1}{Q1 \times Q2}\right)}$$

wherein M1 is the first measured value,
wherein M2 is the second measured value,
wherein Q1 is a first cross-sensitivity coefficient that maps the cross-sensitivity of the first analytical measuring device to the second measurand,
wherein Q2 is a second cross-sensitivity coefficient that maps the cross-sensitivity of the second analytical measuring device to the first measurand and the dependence of the first measured value on the third measured value.

In one embodiment of the invention, the corrected second measured value is calculated using the following formula:

$$KM2 = \frac{M2 - \frac{M1}{Q2}}{\left(1 - \frac{1}{Q1 \times Q2}\right)}$$

wherein M1 is the first measured value,
wherein M2 is the second measured value,
wherein Q1 is a first cross-sensitivity coefficient that maps the cross-sensitivity of the first analytical measuring device to the second measurand,
wherein Q2 is a second cross-sensitivity coefficient that maps the cross-sensitivity of the second analytical measuring device to the first measurand and the dependence of the first measured value on the third measured value.

In one embodiment of the invention, the second cross-sensitivity coefficient is calculated using the following formula:

$$\left(\frac{Q3}{1 - \left(\frac{1}{1 + 10^{(pKs - M3)}}\right)}\right)$$

wherein Q3 is a third cross-sensitivity coefficient that maps the cross-sensitivity of the second analytical measuring device to the first measurand,
wherein pKs is the acidity constant of the first measurand,
wherein M3 is the third measured value.

In one embodiment of the invention, the first analytical measuring device and the second analytical measuring device are each an amperometric sensor and each have a measuring membrane, at least two electrodes, and an electrolyte. The first cross-sensitivity coefficient depends on the properties of the measuring membrane, the properties of the electrodes and their control, and the properties of the electrolyte.

In one embodiment of the invention, the first analytical measuring device and the second analytical measuring device are an amperometric sensor and have a measuring membrane, at least two electrodes, and an electrolyte. The third cross-sensitivity coefficient depends on the properties of the measuring membrane, the properties of the electrodes and their control, and the properties of the electrolyte.

In one embodiment of the invention, the first analytical measuring device is a sensor for measuring free chlorine, the second analytical measuring device is a sensor for measuring chlorine dioxide, and the third analytical measuring device is a pH sensor.

This object according to the invention is furthermore achieved by a measuring point according to claim 8.

The measuring point according to the invention is suitable for carrying out the method according to the invention described above. The measuring point includes a first analytical measuring device which is suitable for determining a first measured value of a first measurand, a second analytical measuring device which is suitable for determining a second measured value of a second measurand different from the first measurand, and a third analytical measuring device which is suitable for determining a third measured value of a third measurand different from the first measurand and the second measurand. The measuring point also includes a control unit connected to the first analytical measuring device, the second analytical measuring device, and the third analytical measuring device. The first analytical measuring device has a cross-sensitivity to the second measurand, and the first measured value shows a dependence on the third measured value. The second analytical measuring device has a cross-sensitivity to the first measurand. The third analytical measuring device does not have any cross-sensitivity to the first measurand or to the second measurand. The control unit is suitable for calculating a corrected first measured value and a corrected second measured value.

In one embodiment of the invention, the first analytical measuring device is a free chlorine sensor, the second analytical measuring device is a chlorine dioxide sensor, and the third analytical measuring device is a pH sensor, or the first analytical measuring device is a bromine sensor, the second analytical measuring device is a total chlorine sensor, and the third analytical measuring device is a pH sensor.

BRIEF DESCRIPTION OF THE DRAWING

The invention is explained in more detail on the basis of the following description of the FIGURE.

FIG. 1 shows a schematic depiction of a measuring point according to the present disclosure.

DETAILED DESCRIPTION

FIG. 1 shows an exemplary illustration of a measuring point 1 according to the invention for measuring different analytes in an analysis medium 6. The measuring point 1 comprises a first analytical measuring device 2, a second analytical measuring device 3, a third analytical measuring device 4 and a control unit 5.

The first analytical measuring device 2 is suitable for determining a first measured value M1 of a first measurand G1. The second analytical measuring device 3 is suitable for determining a second measured value M2 of a second measurand G2 different from the first measurand G1. The third analytical measuring device 4 is suitable for determining a third measured value M3 of a third measurand G3 different from the first measurand G1 and the second measurand G2.

The control unit 5 is connected to each analytical measuring device using communication technology. The connection may be realized as an electrical wired or a wireless connection. The control unit 5 is suitable for correcting the first measured value M1, i.e., for calculating a corrected first measured value KM1, and for correcting the second measured value M2, i.e., for calculating a corrected second measured value KM2.

The first analytical measuring device 2 has a cross-sensitivity to the second measurand G2. The first measured value M1 has a dependence on the third measured value M3. The second analytical measuring device 3 has a cross-sensitivity to the first measurand G1. The third analytical measuring device 3 does not have any cross-sensitivity to the first measurand G1 or to the second measurand G2.

In the context of the invention, the term "cross-sensitivity" is understood to mean that an analytical measuring device which is intended to quantify a first analyte in an analysis medium is also suitable for quantifying a second analyte different from the first analyte in an analysis medium. That is to say, the analytical measuring device has sensitivity to the first analyte and the second analyte.

The terms "analyte" and "measurand" are used synonymously in this description.

In the context of the invention, the term "dependence of a measured value on another measured value" is understood to mean that a different measured value of an associated other measurand is used to determine a measured value of an associated measurand. For example, if the free chlorine content in an analysis medium is to be indicated by a free chlorine sensor, the pH of the analysis medium must be known so that the free chlorine content can be indicated. There is thus a direct dependence between the free chlorine content and the pH value of the analysis medium 6. When free chlorine is dependent on the pH value, the species changes, i.e., gaseous HOCl influences the measurement of free chlorine at low pH values and OCl— influences the measurement of free chlorine at high pH values. More precisely, $Cl_2$ is predominantly present between pH 0 and pH 4, HOCl is predominantly present between pH 4 and pH 8, OCl— is predominantly present between pH 8 and pH 14.

The first measurand G1 is, for example, HOCl, i.e., the first analytical measuring device 2 is a sensor for measuring free chlorine. The second measurand G2 is, for example, $ClO_2$, i.e., the second analytical measuring device 3 is a chlorine dioxide sensor. The third measurand is the pH of the analysis medium 6, i.e., the third analytical measuring device 4 is a pH sensor.

Generally speaking, the first analytical measuring device and the second analytical measuring device can be selected arbitrarily provided that both analytical measuring devices are cross-sensitive to the analyte measured by the respective other analytical measuring device and provided that the first measured value of the first analytical measuring device is dependent on a third measured value determined by a third analytical measuring device sensitive to a third analyte and provided that the second measured value of the second analytical measuring device is independent of the third measured value.

Thus, for example, the following sensor pairs, which each have a cross-sensitivity to one another to the measurand measured by the respective other sensor, are possible as first analytical measuring device and second analytical measuring device in a measuring point 1:

Peracetic acid sensor and total chlorine sensor;
Free chlorine sensor and total chlorine sensor;
Free chlorine sensor and free bromine sensor;
Total chlorine sensor and total bromine sensor;
Chlorine dioxide sensor and chlorate sensor;
Free chlorine sensor and chlorine dioxide sensor.

For those sensor pairs which are sensitive to free chlorine or bromine, in addition to the first and second analytical measuring devices, a pH sensor is also present as a third analytical measuring device 4 for measuring the pH of the analysis medium 6 in the measuring point 1.

In another alternative embodiment, it is possible to implement the first and second analytical measuring devices as a single analytical measuring device, a dual analytical measuring device. The dual analytical measuring device is sensitive to both measurands to which the first and second analytical measuring devices were sensitive. The dual analytical measuring device is suitable for measuring temporally offset measured values for two different measurands.

The method for correcting the first measured value M1 and the second measured value M2 is described below.

In a first step, the above-described measuring point 1 is provided with the first analytical measuring device 2, the second analytical measuring device 3, the third analytical measuring device 4 and the control unit 5. The analytical measuring devices are of course in contact with the analysis medium 6 so that the analytical measuring devices can each measure the predetermined analyte.

The first analytical measuring device 2 then determines the first measured value M1 of the first measurand G1. For this purpose, the first analytical measuring device 2 measures the concentration of an analyte representing the first measurand G1 in the analysis medium 6. The second analytical measuring device 3 determines the second measured value M2 of the second measurand G2. For this purpose, the second analytical measuring device 3 measures the concentration of an analyte representing the second measurand G2 in the analysis medium 6. The third analytical measuring device 4 determines the third measured value M3 of the third measurand G3. For this purpose, the third analytical measuring device 3 measures the concentration of an analyte representing the third measurand G3 in the analysis medium 6.

In an alternative embodiment in which only one dual analytical measuring device is used instead of the first and second analytical measuring devices 1, 2, the step of determining the first measured value M1 and the step of determining the second measured value M2 are carried out temporally offset from one another by the dual analytical measuring device. If the dual analytical measuring device is, for example, a free chlorine and chlorine dioxide sensor, the time offset of the two steps is, for example, 30 minutes. When determining the first measured value M1, for example, a different polarization voltage is used at the electrodes than when determining the second measured value M2.

The control unit 5 then calculates the corrected first measured value KM1. For this purpose, the first measured value M1, the second measured value M2, the cross-sensitivity of the first analytical measuring device 2 to the second measurand G2 are taken into account; likewise, the dependence of the first measured value M1 on the third measured value M3 is compensated for this purpose.

The calculation of the corrected first measured value KM1 can also be described by the following formula:

$$KM1 = \frac{M1 - \frac{M2}{Q1}}{\left(1 - \frac{1}{Q1 \times Q2}\right)}$$

wherein M1 is the first measured value, M2 is the second measured value, Q1 is a first cross-sensitivity coefficient mapping the cross-sensitivity of the first analytical measuring device 2 to the second measurand G2, Q2 is a second cross-sensitivity coefficient mapping the cross-sensitivity of the second analytical measuring device 3 to the first measurand G1 and the dependence of the first measured value M1 on the third measured value M3.

The control unit 5 also calculates the corrected second measured value KM2. For this purpose, the first measured value M1, the second measured value M2 and the cross-sensitivity of the second analytical measuring device 3 to the first measurand G1 are taken into account; likewise, the dependence of the first measured value M1 on the third measured value M3 is compensated for this purpose.

The calculation of the corrected second measured value KM2 can also be described by the following formula:

$$KM2 = \frac{M2 - \frac{M1}{Q2}}{\left(1 - \frac{1}{Q1 \times Q2}\right)}$$

wherein M1 is the first measured value, M2 is the second measured value, Q1 is a first cross-sensitivity coefficient mapping the cross-sensitivity of the first analytical measuring device 2 to the second measurand G2, Q2 is a second cross-sensitivity coefficient mapping the cross-sensitivity of the second analytical measuring device 3 to the first measurand G1 and the dependence of the first measured value M1 on the third measured value M3.

The second cross-sensitivity coefficient Q2 is calculated using the following formula:

$$Q2 = \left(\frac{Q3}{1 - \left(\frac{1}{1 + 10^{(pKs - M3)}}\right)}\right)$$

wherein Q3 is a third cross-sensitivity coefficient mapping the cross-sensitivity of the second analytical measuring device 3 to the first measurand G1, wherein pKs is the acidity constant of the first measurand G1, wherein M3 is the third measured value.

The pKs differs depending on the measurand of the first analytical sensor 2. For example, if the first analytical sensor 2 is a free chlorine sensor, pKs=7.53. Thus, the second cross-sensitivity coefficient Q2 is conditional upon the pH dependence. Q3 is pH independent.

The determination of the cross-sensitivity coefficients Q1, Q2, Q3 depends on the structural properties of the first analytical sensor 2 and the second analytical sensor 3.

If the first analytical sensor 2 and the second analytical sensor 3 are each amperometric sensors, each having a measuring membrane, at least two electrodes, and an electrolyte, then the first cross-sensitivity coefficient Q1, the second cross-sensitivity coefficient Q2 and the third cross-sensitivity coefficient Q3 depend on the properties of the measuring membrane, the properties of the two electrodes and their control, and the properties of the electrolytes of the amperometric sensors.

With respect to the measuring membrane, especially the pore density, the pore size, the thickness of the membrane, the hydrophilic properties of the membrane and the material of the membrane have an influence on the value of the cross-sensitivity coefficients.

With respect to the electrodes, especially the diameter, the material and the applied polarization voltage have an influence on the value of the cross-sensitivity coefficients.

With respect to the electrolyte, especially the pH of the electrolyte, the salt content of the electrolyte, the conductivity of the electrolyte, the viscosity of the electrolyte, and the water content of the electrolyte have an influence on the value of the cross-sensitivity coefficients.

In order to determine the cross-sensitivity coefficients, which, as stated, depend on the structural properties and the use of the first analytical sensor and of the second analytical sensor, measurements over the entire pH range with both analysis substances are necessary for both analytical sensors.

The invention claimed is:

1. A method for correcting a first measured value of a first measurand of a first analytical measuring device and a second measured value of a second measurand of a second analytical measuring device, wherein the first analytical measuring device has a first cross-sensitivity to the second measurand and the second analytical measuring device has a second cross-sensitivity to the first measurand, the method comprising the following steps:
   providing a measuring system comprising:
      the first analytical measuring device which is suitable for determining the first measured value of the first measurand,
      the second analytical measuring device which is suitable for determining the second measured value of the second measurand which differs from the first measurand,
      a third analytical measuring device which is suitable for determining a third measured value of a third measurand which differs from the first measurand and the second measurand, and
      a control unit which is connected to the first analytical measuring device, the second analytical measuring device and the third analytical measuring device,
      the first analytical measuring device having the first cross-sensitivity to the second measurand and the first measured value having a dependence on the third measured value,
      the second analytical measuring device having the second cross-sensitivity to the first measurand,
      the third analytical measuring device not having any cross-sensitivity to the first measurand or to the second measurand;
   determining the first measured value using the first analytical measuring device;
   determining the second measured value using the second analytical measuring device;
   determining the third measured value by using the third analytical measuring device;
   calculating a corrected first measured value using the control unit by taking into account the first measured value, the second measured value, the cross-sensitivity of the first analytical measuring device to the second measurand and compensating for the dependence of the first measured value on the third measured value; and calculating a corrected second measured value using the control unit by taking into account the first measured value, the second measured value and the cross-sensitivity of the second analytical measuring device to the first measurand and compensating for the dependence of the first measured value on the third measured value;

wherein the first analytical measuring device is an electrochemical sensor for measuring free chlorine of a common liquid medium, the second analytical measuring device is an electrochemical sensor for measuring chlorine dioxide of the common liquid medium, and the third analytical measuring device is an electrochemical pH sensor of the common liquid medium.

2. A measuring system for carrying out a method for correcting a first measured value of a first measurand of a first analytical measuring device and a second measured value of a second measurand of a second analytical measuring device, wherein the measuring system comprises:

the first analytical measuring device which is suitable for determining the first measured value of the first measurand, the second analytical measuring device which is suitable for determining the second measured value of the second measurand which differs from the first measurand, a third analytical measuring device which is suitable for determining a third measured value of a third measurand which differs from the first measurand and the second measurand; and a control unit which is connected to the first analytical measuring device, the second analytical measuring device and the third analytical measuring device;

the first analytical measuring device having a first cross-sensitivity to the second measurand and the first measured value having a dependence on the third measured value;

the second analytical measuring device having a second cross-sensitivity to the first measurand;

the third analytical measuring device not having any cross-sensitivity to the first measurand or to the second measurand;

the control unit being suitable for calculating a corrected first measured value and a corrected second measured value;

wherein the first analytical measuring device is a free chlorine sensor, the second analytical measuring device is a chlorine dioxide sensor and the third analytical measuring device is a pH sensor, or the first analytical measuring device is a bromine sensor, the second analytical measuring device is a total chlorine sensor and the third analytical measuring device is the pH sensor, wherein all sensors detect measured values of a common liquid medium.

* * * * *